US008203855B2

(12) United States Patent
Shimada et al.

(10) Patent No.: US 8,203,855 B2
(45) Date of Patent: Jun. 19, 2012

(54) COMPLEX INDUCTOR AND POWER SUPPLY UNIT (75) Inventors: Takae Shimada, Hitachi (JP); Kimiaki Taniguchi, Nakai (JP); Hiroyuki Shoji, Hitachi (JP)

(73) Assignee: Hitachi Computer Peripherals Co., Ltd., Kanagawa (JP)

( * ) Notice: Subject to any disclaimer, the term of this patent is extended or adjusted under 35 U.S.C. 154(b) by 529 days.

(21) Appl. No.: 12/328,995

(22) Filed: Dec. 5, 2008

(65) Prior Publication Data
US 2009/0147541 A1 Jun. 11, 2009

(30) Foreign Application Priority Data

Dec. 11, 2007 (JP) ................................. 2007-320221

(51) Int. Cl.
*H02M 3/335* (2006.01)
(52) U.S. Cl. ........................................................ 363/16
(58) Field of Classification Search .......... 336/180–184, 336/212, 214–215, 170, 173; 363/16, 17, 363/97–98, 131–132; 323/205–209
See application file for complete search history.

(56) References Cited

U.S. PATENT DOCUMENTS

| 5,053,937 | A | * | 10/1991 | Blockl .............................. 363/16 |
| 5,646,836 | A | | 7/1997 | Sadarnac et al. |
| 5,841,335 | A | | 11/1998 | Onishi et al. |
| 5,847,941 | A | * | 12/1998 | Taguchi et al. ............. 363/21.03 |
| 7,656,686 | B2 | * | 2/2010 | Yasumura .................. 363/21.02 |
| 2004/0119577 | A1 | | 6/2004 | Weger |
| 2006/0186981 | A1 | | 8/2006 | Jang et al. |
| 2006/0220777 | A1 | | 10/2006 | Nakahori |

FOREIGN PATENT DOCUMENTS

| EP | 1 760 867 | 3/2007 |
| JP | 06-338428 | 12/1994 |
| JP | 08-298219 | 11/1996 |
| JP | 09-129450 | 5/1997 |
| JP | 2001-319817 | 11/2001 |
| JP | 2005-176540 | 6/2005 |
| WO | WO 95/29493 | 11/1995 |

OTHER PUBLICATIONS

Serguei Moisseev et al., Soft-Switching Phase-Shifted PWM Full-Bridge DC-DC Converter with Reduced Conduction Losses, The Institute of Electronics, Information and Communication Engineers, Nov. 2000), pp. 73-78, vol. 102 No. 475. (English Translation).

* cited by examiner

*Primary Examiner* — Tuyen Nguyen
(74) *Attorney, Agent, or Firm* — Antonelli, Terry, Stout & Kraus, LLP.

(57) ABSTRACT

A complex inductor according to the present invention changes its magnetic coupling polarity according to currents flowing its two inductors. The complex inductor includes a first magnetic member, around which first and third windings are formed, and a second magnetic member, around which second and fourth windings are formed. A first inductor is formed by connecting the first winding to the second winding, and a second inductor is formed by connecting the third winding to the fourth winding. The two magnetic members are made of a magnetic material having a magnetic permeability that gradually decreases as its magnetic flux density is increased. When the two windings are interconnected in a direction in which induced voltages generated in these windings by the current flowing in the second inductor weaken each other, the magnetic coupling polarity between the first and second inductors changes according to the current flowing in the inductors. The two inductors are magnetically coupled so that, when one of the two inductors stores energy, the current flowing in the other inductor increases, and when one of the two inductors releases energy, the current flowing in the other inductor decreases.

6 Claims, 5 Drawing Sheets

COMPLEX INDUCTOR AND POWER SUPPLY UNIT

CLAIM OF PRIORITY

The present application claims priority from Japanese patent application serial No. 2007-320221, filed on Dec. 11, 2007, the content of which is hereby incorporated by reference into this application.

FIELD OF THE INVENTION

The present invention relates to a complex inductor (reactor) that is used in a power supply circuit or the like and to a power supply unit.

BACKGROUND OF THE INVENTION

As recent electronic units become compact, highly efficient, and inexpensive, power supply units are also required to be compact, highly efficient, and inexpensive. Patent Document 1 below discloses two inductors that share part of a magnetic loop to reduce their costs. In Patent Document 1, a single core member is used to provide two inductors that are magnetically independent of each other.

Patent Document 2 below discloses a resonant reactor and a smoothing reactor that are structured by forming a plurality of windings around a plurality of closed magnetic paths. The resonant reactor disclosed in Patent Document 2 is magnetically coupled with the smoothing reactor to reduce current flowing in the smoothing reactor.

Patent Document 3 below discloses a choke coil having a single closed magnetic path around which two windings are formed. The technology disclosed in Patent Document 3 provides a compact, inexpensive choke coil that can easily obtain a predetermined inductance or a choke coil having a nonlinear inductance by providing a narrow magnetic path on a magnetic member that forms a closed magnetic path.

Non-patent Document 1 below discloses an insulated DC-DC converter that uses a tapped inductor-type filter. The DC-DC converter disclosed in Non-patent Document 1 is highly efficient: it reduces circulating current flowing in a transformer while a smoothing inductor releases energy.

Patent Document 1: Japanese Patent Laid-open No. Hei 8(1996)-298219

Patent Document 2: Japanese Patent Laid-open No. 2005-176540

Patent Document 3: Japanese Patent Laid-open No. 2001-319817

Non-patent Document 1: The Institute of Electronics, Information, and Communication Engineers (IEICE), Energy Engineering in Electronics and Communications (EE), Vol 1. 102, No. 475 (20021018) pp. 73-78

SUMMARY OF THE INVENTION

The two conventional inductors disclosed in Patent Document 1 may impose restrictions on freedom of power supply circuit design because the two inductors are magnetically independently of each other.

The two conventional reactors disclosed in Patent Document 2 may also impose restrictions on freedom of power supply circuit design because the magnetically coupled polarities of the two reactors are the same independently of the directions and values of currents flowing in the two reactors.

The conventional choke coil disclosed in Patent Document 3 may also impose restrictions on freedom of power supply circuit design because the magnetically coupled polarities of the two windings are the same independently of the directions and values of currents flowing in the two windings.

The conventional DC-DC converter disclosed in Non-patent Document 1 needs a free-wheeling diode to reduce the circulating current, making the converter expensive.

An object of the present invention is to provide a complex inductor (reactor) including two inductors in which magnetically coupled polarities of the two inductors change depending on the directions and values of currents flowing in the two inductors.

Another object of the present invention is to provide a compact, highly efficient, inexpensive power supply unit by using the complex inductor according to the present invention.

In one aspect, the complex inductor according to the present invention comprises: a magnetic member having at least a first closed magnetic path and a second closed magnetic path, the magnetic member being structured so that a magnetic resistance of the magnetic member increases as a magnetic flux passing through the closed magnetic path increases; a first inductor including one winding or a plurality of windings formed around at least part of the first closed magnetic path and part of the second closed magnetic path, the windings being mutually connected; and a second inductor including one winding or a plurality of windings around at least part of the first closed magnetic path and part of the second closed magnetic path, the windings being mutually connected; when currents flow in both the first and second inductors, a magnetic flux generated by a current flowing in the first inductor and a magnetic flux generated by a current flowing in the second inductor strengthen each other in one of the first and second closed magnetic paths and weaken each other in the other closed magnetic path.

In one aspect, a power supply unit according to the present invention includes a complex inductor, a first switching leg in which a first switching element and a second switching element are connected in series, a second switching leg in which a third switching element and a fourth switching element are connected in series, a first smoothing capacitor connected in parallel to the first and second switching legs and a DC power supply, a series-connection body including a resonant inductor and a primary transformer winding, the body being connected between a series-connection point of the first and second switching elements and another series-connection point of the third and fourth switching elements, a transformer in which the primary transformer winding and a secondary transformer winding are magnetically coupled, a rectifying circuit for rectifying a voltage generated in the secondary transformer winding, a smoothing inductor, and a second smoothing capacitor for smoothing, together with the smoothing inductor, the voltage rectified by the rectifying circuit; the power supply unit supplies power to a load connected in parallel to the second smoothing capacitor; the complex inductor includes a magnetic member having at least a first closed magnetic path and a second closed magnetic path, the magnetic member being structured so that a magnetic resistance of the magnetic member increases as the magnetic fluxes flowing in the first and second closed magnetic paths increase, a first inductor including one winding or a plurality of windings formed around at least part of the first and second closed magnetic paths, the windings being mutually connected, and a second inductor including one winding or a plurality of windings formed around at least part of the first and second closed magnetic paths, the windings being mutually connected; when currents flow in both the first and second inductors, a magnetic flux generated by a current flowing in the first inductor and a magnetic flux generated by a current flowing in the second inductor strengthen each other in one of the first and second closed magnetic paths and weaken each other in the other of the first and second closed magnetic paths; the first and second inductors are used as the smoothing inductor and the resonant inductor.

A complex inductor in a preferred mode of the present invention has a first inductor and a second inductor the polarities of which change when the strength of magnetic coupling between the windings of the first and second inductors changes depending on the directions and values of currents flowing in the first and second inductors. A complex inductor in another preferred mode of the present invention causes magnetic coupling in a direction in which, when one of the first and second inductors releases energy, current in the other inductor reduces independently of the directions of the currents flowing in the first and second inductors. A complex inductor in another preferred mode of the present invention causes independent magnetic coupling for each inductor when a current flows only in one of the first and second inductors.

A power supply unit in another preferred mode of the present invention uses the inventive complex inductor as a smoothing inductor and resonant inductor of so that circulating currents flowing in the resonant inductor and transformer winding are reduced while a smoothing inductor in an insulated DC-DC converter release energy, making the power supply compact, highly efficient, and inexpensive.

Other objects and features of the present invention will be clarified in embodiments described below.

DESCRIPTION OF THE PREFERRED EMBODIMENTS

Embodiments of the present invention will be described below in detail with reference to the drawings. In the drawings, like and equivalent elements are denoted by like reference numerals to eliminate duplicate explanation. In these embodiments, a diode is used as an example of a rectifying element, but this is not a limitation.

[First Embodiment]

Figure 1:
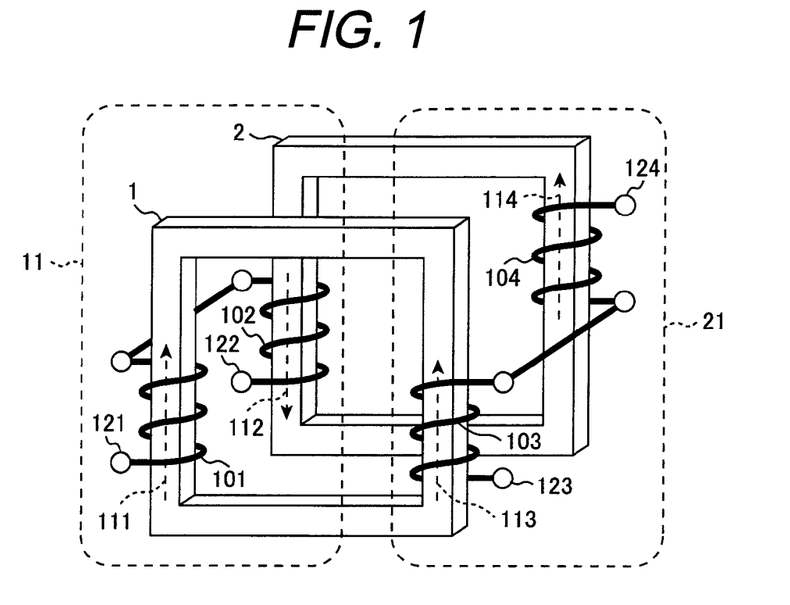
FIG. 1 shows the structure of a complex inductor in a first embodiment of the present invention.

FIG. 1 shows the structure of a complex inductor in a first embodiment of the present invention. The complex inductor, shown in FIG. 1, in the first embodiment includes a magnetic member 1 forming a first closed magnetic path and a magnetic member 2 forming a second closed magnetic path. Windings 101 and 103 are formed around the magnetic member 1, and windings 102 and 104 are formed around the magnetic member 2. One end of the winding 103 is connected to one end of the winding 104. The other end of winding 103 is a terminal 123, and the other end of the winding 104 is a terminal 124. A part between the terminals 123 and 124 is an inductor 21. The windings 101 and 102 are mutually connected in a direction in which, when a current flowing in the inductor 21 is changed, the resulting induced voltage in the winding 101 and the resulting induced voltage in the winding 102 weaken each other. The other end of the winding 101 is a terminal 121, and the other end of the winding 102 is a terminal 122. A part between the terminals 121 and 122 is an inductor 11.

FIG. 1 also shows orientations 111 and 112 of magnetic fluxes generated by the windings 101 and 102 when a current flows from the terminal 121 to the terminal 122, and orientations 113 and 114 of magnetic fluxes generated by the windings 103 and 104 when a current flows from the terminal 123 to the terminal 124.

Action by the complex inductor in the first embodiment will be described next. In the description that follows, it is assumed that the windings 101 and 102 have the same number of turns, and the windings 103 and 104 also have the same number of turns and that the magnetic members 1 and 2 are made of the same magnetic material and worked to the same shape. The magnetic material of the magnetic members 1 and 2 has a characteristic that their magnetic permeability gradually decreases as the magnetic flux density is increased, so their magnetic resistance gradually increases as the density of the magnetic flux passing through the magnetic material is increased.

First, a case in which a current flows only in one of the inductors 11 and 21 will be described.

When a current flows into the inductor 21 with no current in the inductor 11, the windings 103 and 104 respectively generate equal magnetomotive forces in the first and second closed magnetic paths, inducing equal magnetic fluxes around the magnetic members 1 and 2. Voltages induced in the winding 101 and 102 are equal and thereby compensated, so no voltage is generated across both ends of the inductor 11. Accordingly, in this condition, the inductors 11 and 21 have magnetically independent characteristics.

Similarly, it can be easily understood that, when there is no current in the inductor 21, even if a current flows into the inductor 11, no voltage is generated across both ends of the inductor 21. Accordingly, when a current flows only in one of the inductors 11 and 21, they have magnetically independent characteristics.

Next, a case in which currents flow in both the inductors 11 and 21 will be described.

First, suppose that a current flows from the terminal 121 to the terminal 122 in the inductor 11 and a current flows from the terminal 123 to the terminal 124 in the inductor 21. As is clear also from the orientations 111 to 114 of the magnetic fluxes generated by the windings 101 to 104, the magnetic fluxes weaken each other around the magnetic member 1 and the magnetic fluxes are strengthen each other around the magnetic member 2, and thereby the magnetic member 2 has a higher magnetic flux density than the magnetic member 1. As described above, the magnetic members 1 and 2 have smaller magnetic permeability as the magnetic flux density is increased, so the second closed magnetic path has a larger magnetic resistance than the first closed magnetic path. Accordingly, the magnetic coupling between the windings 101 and 103 is stronger than the magnetic coupling between the windings 102 and 104, so the magnetic coupling polarity of the inductors 11 and 21 is determined to be the magnetic coupling polarity of the windings 101 and 103. In this case, the inductors 11 and 21 are magnetically coupled so that the terminals 121 and 124 have an identical polarity.

Accordingly, in the above conditions, the inductors 11 and 21 have a correlation described below. When a positive voltage is applied to the terminal 121 and a negative voltage is applied to the terminal 122, a positive voltage is generated at the terminal 124 and a negative voltage is generated at the terminal 123. That is, when the inductor 11 stores energy, the inductor 21 generates a voltage in a direction to increase its current. In contrast, when a negative voltage is applied to the terminal 121 and a positive voltage is applied to the terminal 122, a negative voltage is generated at the terminal 124 and a positive voltage is generated at the terminal 123. That is, when the inductor 11 releases energy, the inductor 21 generates a voltage in a direction to decrease its current. When a positive voltage is applied to the terminal 123 and a negative voltage is applied to the terminal 124, a positive voltage is generated at the terminal 122 and a negative voltage is generated at the terminal 121. That is, when the inductor 21 stores energy, the inductor 11 generates a voltage in a direction to increase its current. In contrast, when a negative voltage is applied to the terminal 123 and a positive voltage is applied to the terminal 124, a negative voltage is generated at the terminal 122 and a positive voltage is generated at the terminal 121. That is, when the inductor 21 releases energy, the inductor 11 generates a voltage in a direction to decrease its current.

Next, a case in which a current flows from the terminal 121 to the terminal 122 in the inductor 11 and a current flows in the reverse direction in the inductor 21, that is, from the terminal 124 to the terminal 123 will be described. In this case, the magnetic fluxes around the magnetic member 2 weaken each other and thereby the magnetic coupling between the windings 102 and 104 becomes strong, so the magnetic coupling polarity of the inductors 11 and 21 is determined to be the magnetic coupling polarity of the winding 102 and winding 104. In this case, the inductors 11 and 21 are magnetically coupled so that the terminals 121 and 123 have an identical polarity. Accordingly, when the inductor 11 stores energy, the inductor 21 generates a voltage in a direction to increase its current. In contrast, when the inductor 11 releases energy, the inductor 21 generates a voltage in a direction to decrease its current. When the inductor 21 stores energy, the inductor 11 generates a voltage in a direction to increase its current. In contrast, when the inductor 21 releases energy, the inductor 11 generates a voltage in a direction to decrease its current.

Similarly, when a current flows into the inductor 11 from the terminal 122 to the terminal 121 and another current flows into the inductor 21 from the terminal 123 to the terminal 124, the magnetic coupling polarity of the inductors 11 and 21 is determined to be the magnetic coupling polarity of the windings 102 and 104, and the inductors 11 and 21 are magnetically coupled so that the terminals 121 and 123 have an identical polarity. In this case as well, when the inductor 11 stores energy, the inductor 21 generates a voltage in a direction to increase its current; when the inductor 11 releases energy, the inductor 21 generates a voltage in a direction to decrease its current. When the inductor 21 stores energy, the inductor 11 generates a voltage in a direction to increase its current; when the inductor 21 releases energy, the inductor 11 generates a voltage in a direction to decrease its current.

Similarly, when a current flows into the inductor 11 from the terminal 122 to the terminal 121 and another current flows into the inductor 21 from the terminal 124 to the terminal 123, the magnetic coupling polarity of the inductors 11 and 21 is determined to be the magnetic coupling polarity of the windings 101 and 103, and the inductors 11 and 21 are magnetically coupled so that the terminals 121 and 124 have an identical polarity. In this case as well, when the inductor 11 stores energy, the inductor 21 generates a voltage in a direction to increase its current; when the inductor 11 releases energy, the inductor 21 generates a voltage in a direction to decrease its current. When the inductor 21 stores energy, the inductor 11 generates a voltage in a direction to increase its current; when the inductor 21 releases energy, the inductor 11 generates a voltage in a direction to decrease its current.

In summary, when currents flow in both the inductors 11 and 21, the inductors 11 and 21 exhibit magnetically coupled characteristics; when the direction of one of the currents is inverted, the magnetic coupling polarity changes; when the directions of the two currents are inverted, the magnetic coupling polarity remains unchanged. Independently of the directions of the current flowing in the inductors 11 and 21, when one of the inductors 11 and 21 stores energy, they are magnetically coupled in a direction to increase the current in the other inductor; when one of the inductors 11 and 21 releases energy, they are magnetically coupled in a direction to increase the current in the other inductor.

The action of the complex inductor in the first embodiment described above occurs only when the windings 101 and 102 have the same number of turns, and the windings 103 and 104 also have the same number of turns and that the magnetic members 1 and 2 are made of the same magnetic material and worked to the same shape. It can be easily understood that if these conditions change, the inductors 11 and 21 are magnetically coupled even when no current flows in one of the inductors 11 and 21; when currents flows in both the inductors 11 and 21, the current threshold at which the magnetic coupling polarity of the inductors 11 and 21 changes is no longer 0.

In FIG. 1, the magnetic member 2 is disposed at a location to which the magnetic member 1 is moved in parallel from a plane formed by the first closed magnetic path in a direction substantially perpendicular to the plane. When the magnetic members 1 and 2 are relatively disposed in this way, the complex inductor according to the embodiment of the present invention can be made compact. When the complex inductor in the embodiment is used in a power supply unit, the power supply unit can be expected to be made compact by placing a transformer and other circuit parts between the magnetic members 1 and 2.

Although, in FIG. 1, the planes formed by the first and second closed magnetic paths are rectangular, it will be appreciated that even when circular magnetic members, such as so-called toroidal cores, are used, the same effect can be obtained, and even when the magnetic members have a branch point in the first and second closed magnetic paths, that is, they are so-called EE cores or EI cores, the same effect can also be obtained. When magnetic members having a relatively high magnetic permeability, such as ferrites, are used, a gap may be provided so that the magnetic resistance is gradually increased as the density of the magnetic fluxes passing through the first and second closed magnetic paths are increased. This type of gap may also provided for magnetic members having a magnetic permeability that does not change so much in response to increase and decrease in the magnetic flux density and rapidly decreases when the magnetic flux density exceeds a prescribed threshold.

[Second Embodiment]

Figure 2:
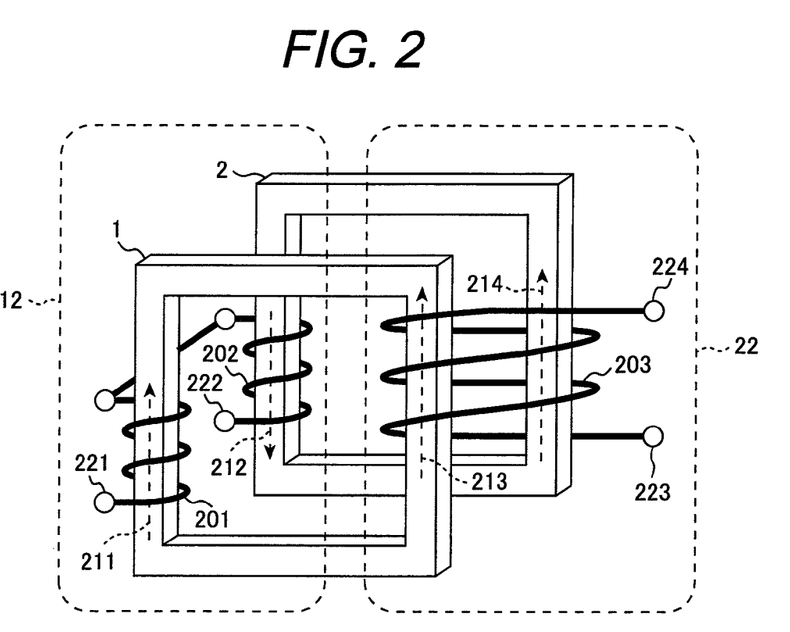
FIG. 2 shows the structure of a complex inductor in a second embodiment of the present invention.

A complex inductor in a second embodiment according to the present invention will be described below with reference to FIG. 2. FIG. 2 shows the structure of a complex inductor in the second embodiment of the present invention. The complex inductor, shown in FIG. 2, in the second embodiment includes a magnetic member 1 forming a first closed magnetic path and a magnetic member 2 forming a second closed magnetic path. A winding 201 is formed around the magnetic member 1, and winding 202 is formed around the magnetic member 2. A winding 203 is formed in such a way that the magnetic members 1 and 2 are bound together. One end of the winding 201 is connected to one end of the winding 202 so that a magnetic flux generated by a current flowing in the winding 201 and a magnetic flux generated by a current flowing in the winding 202 are cross-linked in a reverse direction with respect to the winding 203. The other end of winding 201 is a terminal 221, and the other end of the winding 202 is a terminal 222. A part between the terminals 221 and 222 is an inductor 12. Both ends of the winding 203 are terminals 223 and 224. A part between the terminals 223 and 224 is an inductor 22.

FIG. 2 also shows orientations 211 and 212 of magnetic fluxes generated by the windings 201 and 202 when a current flows from the terminal 221 to the terminal 222, and orientations 213 and 214 of magnetic fluxes generated by the winding 203 in the magnetic members 1 and 2 when a current flows from the terminal 223 to the terminal 224.

It can be understood that the inductors 12 and 22 of the complex inductor in the second embodiment act in the same way as the inductors 11 and 21 of the complex inductor, shown in FIG. 1, in the first embodiment act. The complex inductor in the second embodiment has an effect of simplifying the structure of the inductor 22, when compared with the complex inductor in the first embodiment.

[Third Embodiment]

Figure 3:
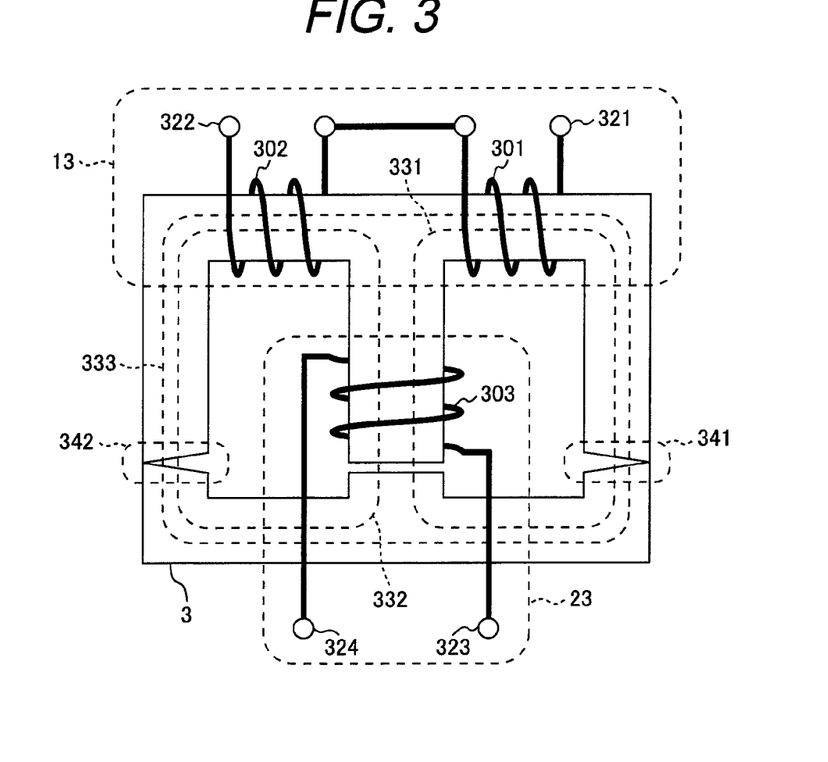
FIG. 3 shows the structure of a complex inductor in a third embodiment of the present invention.

FIG. 3 shows the structure of a complex inductor in a third embodiment of the present invention. The complex inductor, shown in FIG. 3, in the third embodiment includes a magnetic member 3 forming closed magnetic paths 331, 332, and 333. A winding 301 is formed around a part shared by the closed magnetic paths 331 and 333, a winding 302 is formed around a part shared by the closed magnetic paths 332 and 333, and a winding 303 is formed around a part shared by the closed magnetic paths 331 and 332. Both ends of the winding 303 are terminals 323 and 324. A part between the terminals 323 and 324 is an inductor 23. One end of the winding 301 is connected to one end of the winding 302 in a direction in which an induced voltage generated by a current flowing in the inductor 23 in the winding 301 and an induced voltage in the winding 302 weaken each other. The other end of the winding 301 is a terminal 321, and the other end of the winding 302 is a terminal 322. A part between the terminals 321 and 322 is an inductor 13.

The part shared by the closed magnetic paths 331 and 333 is provided with a gap 341, and the part shared by the closed magnetic paths 332 and 333 is also provided with a gap 342. These gaps have a smaller cross section than other parts of the magnetic members. The shape of the cross section gradually changes in a direction perpendicular to the magnetic path so that the magnetic resistance gradually increases as the density of the magnetic flux passing through the magnetic member is increased. Of course, the magnetic member 3 may be another magnetic member having a magnetic permeability that gradually decreases as the magnetic flux density is increased. In this case, the gap need not be provided. The gap is not limited to the aspect shown in FIG. 3; one gap or a plurality of gaps may be provided in the magnetic member.

The closed magnetic paths 331 and 332 of the complex inductor in the third embodiment are respectively equivalent to the first and second closed magnetic paths of the complex inductor in the first embodiment. Since, in both embodiments, the magnetic resistance gradually increases as the density of the magnetic flux is increased, it can be understood that the inductors 13 and 23 of the complex inductor in the third embodiment act in the same way as the inductors 11 and 21 of the complex inductor, shown in FIG. 1, in the first embodiment act. The complex inductor in the third embodiment can have fewer magnetic members than the complex inductor in the first embodiment.

[Fourth Embodiment]

Figure 4:
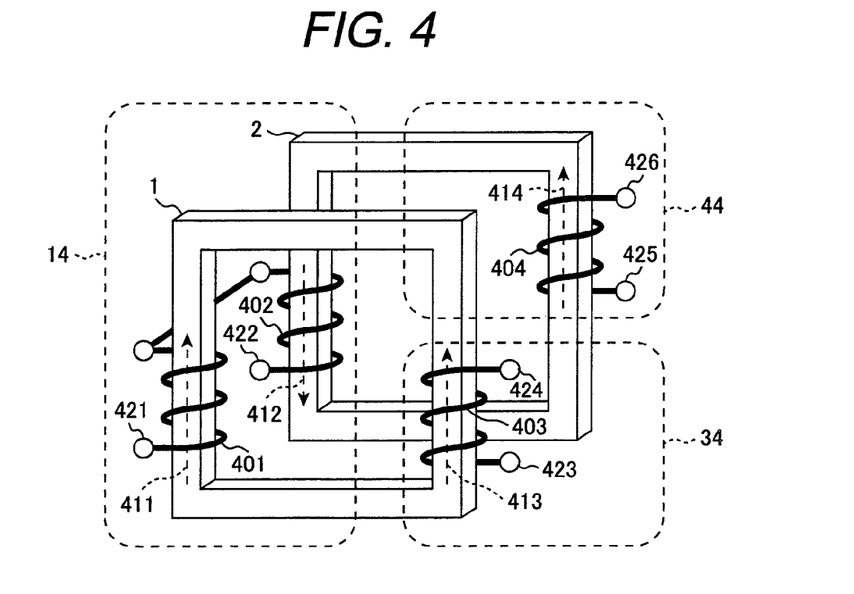
FIG. 4 shows the structure of a complex inductor in a fourth embodiment of the present invention.

A complex inductor in a fourth embodiment according to the present invention will be described below with reference to FIG. 4. FIG. 4 shows the structure of a complex inductor in the fourth embodiment of the present invention. The complex inductor, shown in FIG. 4, in the fourth embodiment includes a magnetic member 1 forming a first closed magnetic path and a magnetic member 2 forming a second closed magnetic path. Windings 401 and 403 are formed around the magnetic member 1, and windings 402 and 404 are formed around the magnetic member 2. Both ends of the winding 403 are terminals 423 and 424. A part between the terminals 423 and 424 is an inductor 34. Both ends of the winding 404 are terminals 425 and 426. A part between the terminals 425 and 426 is an inductor 44. One end of the winding 401 is connected to one end of the winding 402 in a direction in which an induced voltage generated in the winding 401 by a current flowing from the terminal 423 to the terminal 424 and an induced voltage generated in the winding 402 by a current flowing from the terminal 425 to the terminal 426 weaken each other. The other end of the winding 401 is a terminal 421, and the other end of the winding 402 is a terminal 422. A part between the terminals 421 and 422 is an inductor 14.

FIG. 4 also shows orientations 411 and 412 of magnetic fluxes generated by the windings 401 and 402 when a current flows from the terminal 421 to the 422, an orientation 413 of a magnetic flux generated by the winding 403 when a current flows from the terminal 423 to the terminal 424, and an orientation 414 of a magnetic flux generated by the winding 404 when a current flows from the terminal 425 to the terminal 426.

Action by the complex inductor in the fourth embodiment will be described next. In the description that follows, it is assumed that the windings 401 and 402 have the same number of turns, and the windings 403 and 404 also have the same number of turns and that the magnetic members 1 and 2 are made of the same magnetic material and worked to the same shape. The magnetic material of the magnetic members 1 and 2 has a characteristic that their magnetic permeability gradually decreases as the magnetic flux density is increased so that their magnetic resistance gradually increases as the density of the magnetic fluxes passing through the magnetic members 1 and 2 is increased.

In the structure of the complex inductor in the fourth embodiment, the inductor 21 of the complex inductor, shown in FIG. 1, in the first embodiment is divided into two inductors 34 and 44. Accordingly, it can be easily understood that a current flows into the inductor 34 from the terminal 423 to the terminal 424 and a current flows into the inductor 44 from the terminal 425 to the terminal 426, the values of the two currents and their changes are substantially the same, and the inductors 34 and 44 are magnetically coupled in a direction to decrease the current in the inductor 14 when they release energy.

Even when both the inductors 34 and 44 release energy, if the values of the currents flowing in the inductors 34 and 44 vary, the degree of the effect of reducing the current flowing in the inductor 14 may vary depending on the direction in which the current flows in the inductor 14. For example, suppose that currents flow in the inductors 34 and 44 in the direction described above, the value of the current flowing in the inductor 44 is larger than the value of the current flowing in the inductor 34, the windings 401 and 402 generate a smaller magnetomotive force than the windings 404. Then, when a current flows into the inductor 14 from the terminal 421 to the terminal 422, a difference in the magnetic flux density between the magnetic members 1 and 2 becomes larger than when the current flows in the reverse direction, so a difference in the magnetic resistance between the first and second closed magnetic paths becomes significant and the current in the inductor 14 is further reduced.

[Fifth Embodiment]

Figure 5:
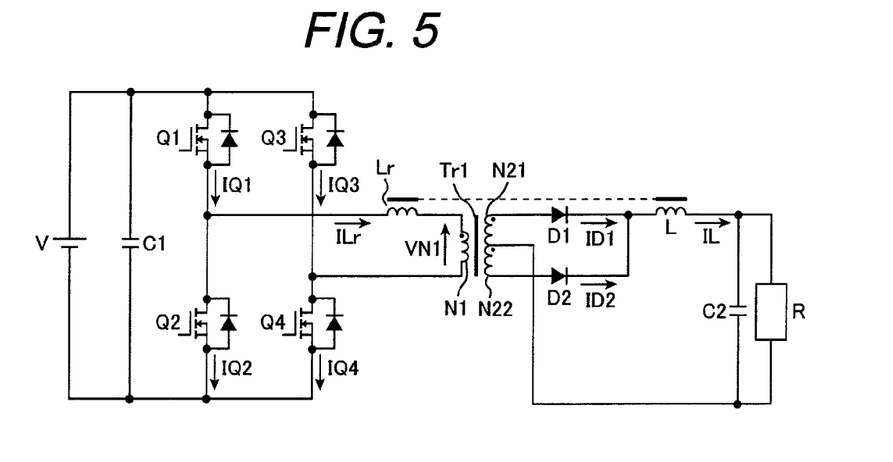
FIG. 5 is a circuit diagram of the power supply unit in a fifth embodiment of the present invention.

A power supply unit in a fifth embodiment according to the present invention will be described below with reference to FIG. 5, a complex inductor that embodies the present invention being applied to the power supply unit. FIG. 5 is a circuit diagram of the power supply unit in the fifth embodiment of the present invention. As shown in FIG. 5, connected to the DC power supply V in parallel are a first switching leg in which switching elements Q1 and Q2, to each of which a back-to-back diode is connected, are connected in series, a second switching leg in which switching elements Q3 and Q4, to each of which a back-to-back diode is connected, are connected in series, and a smoothing capacitor C1. When metal oxide semiconductor field-effect transistors (MOSFETs) are used as the switching elements, MOSFET body diodes can be used instead of the back-to-back diodes. A winding N1 and a resonant inductor Lr are connected in series between a series connection point of the switching elements Q1 and Q2 and a series connection point of the switching elements Q3 and Q4.

A transformer Tr1 magnetically couples windings N1, N21, and N22. One end of the winding N21 is connected to one end of the winding N22. The other end of the winding N21 is connected to one end of a diode D1. The other end of the winding N22 is connected to one end of a diode D2. The other end of the diode D1 is connected to the other end of the diode D2. One end of a smoothing inductor L is connected to a connection point of the diodes D1 and D2. One end of a smoothing capacitor C2 is connected to the other end of the smoothing inductor L. A connection point of the windings N21 and N22 is connected to the other end of the smoothing capacitor C2.

The power supply unit in the fifth embodiment turns on and off the switching elements Q1 to Q4 and supplies energy from the DC power supply V to a load R connected to the smoothing capacitor C2.

The complex inductor, shown in FIG. 1, according to the first embodiment of the present invention is used as the resonant inductor Lr and smoothing inductor L; the inductor 11 is used as the resonant inductor Lr and the inductor 21 is used as the smoothing inductor L.

Voltages and currents in the circuit diagram in FIG. 5 will be defined before the operation of the circuit is described in detail. Control signals for turning on and off the switching elements Q1 to Q4 are gate signals VgQ1 to VgQ4, which are turned on when they are logically high, and turned off when they are logically low. Synthesized currents flowing in the switching elements Q1 to Q4 and the back-to-back diodes connected to them are denoted IQ1 to IQ4. The forward direction of each switching element is the positive direction. The forward directions of the currents ID1 and ID2 flowing in the diodes D1 and D2 are the positive directions.

A voltage VN1 across the winding N1 is positive when the current flows from the second switching leg to the first switching leg. A current ILr in the resonant inductor Lr is positive when it flows from the first switching leg to the second switching leg. A current IL in the smoothing inductor L is positive when it flows from the connection point of the diodes D1 and D2 to the smoothing capacitor C2.

Figure 10:
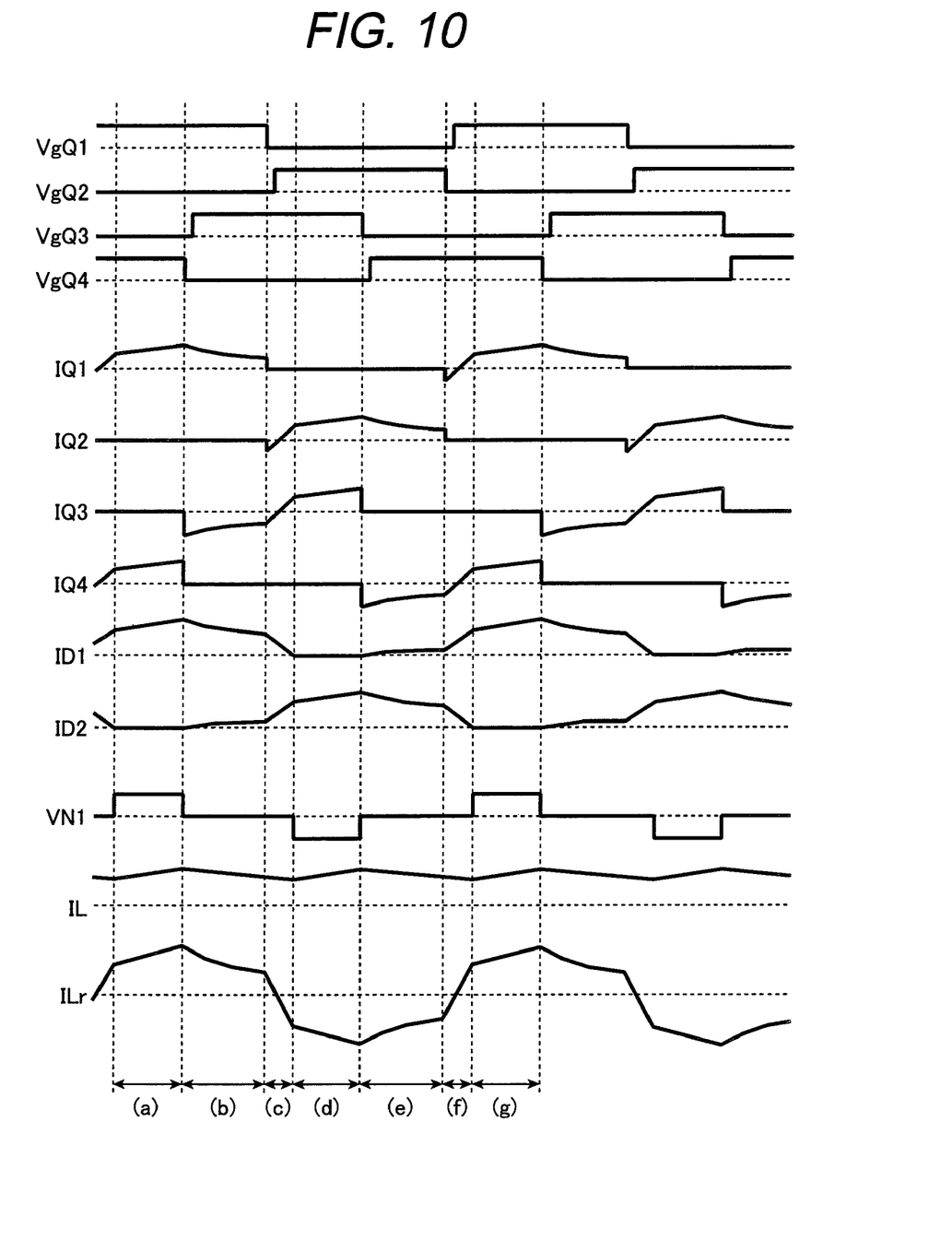
FIG. 10 shows waveforms of voltages and currents used to explain the operation of the power supply unit in the fifth embodiment.

FIG. 10 shows waveforms of voltages and currents used to explain the operation of the power supply unit in the fifth embodiment. The operation of the power supply unit according to the fifth embodiment will be described below with reference to FIG. 10. In FIG. 10, (a) to (g) represent modes a to g.

(Mode a)

In mode a, the switching elements Q1 and Q4 are turned on, and the switching elements Q2 and Q3 are turned off. The voltage of the DC power supply V is applied to the winding N1 of the transformer Tr1 through the switching elements Q1 and Q4 and the resonant inductor Lr. The diode D2 is blocked. A voltage generated in the winding N21 is applied to the smoothing inductor L through the diode D1 and smoothing capacitor C2 and thereby the current IL gradually increases, supplying energy to the load R.

(Mode b)

When the switching element Q4 is turned off, the current ILr flowing in the switching element Q4 brings the back-to-back diode of the switching element Q3 into conduction. The switching element Q3 is then turned on. The current ILr flows back by passing through the resonant inductor Lr, the winding N1, the back-to-back diode of the switching element Q3, and the switching element Q1 in that order. The current flowing in the resonant inductor Lr and winding N1 in mode b is referred to below as the circulating current.

The voltage of the DC power supply V is not applied to the winding N1. Therefore, the energy stored in the smoothing inductor L is supplied to the load R and the current IL gradually decreases.

As described above, in the fifth embodiment, the inductors 11 and 21 of the complex inductor, shown in FIG. 1, according to the first embodiment of the present invention are respectively used as the resonant inductor Lr and smoothing inductor L; when the inductor 21 releases energy, the complex inductor in the first embodiment causes magnetic coupling in a direction to reduce the current in the inductor 11.

Accordingly, the current ILr in the inductor Lr gradually decreases, and the circulating current decreases. When the circulating decreases, energy lost in the path through which the circulating current flows can be reduced.

Due to the reduction in the circulating current, the current flowing in a path including the winding N21 and diode D1 branches into a path including the winding N22 and diode D2. As the circulating current is reduced, the current branches more evenly to these two paths, reducing a conduction loss.

When the circulating current is further reduced, breaking current in the switching element Q1 reduces during a switchover from mode b to mode c, described below, and thereby a switching loss is also reduced.

As described above, when the circulating current is reduced, both the conduction loss and switching loss can be reduced and thereby the efficiency of the power supply unit can be increased.

(Mode c)

When the switching element Q1 is turned off, the circulating current flowing in the switching element Q1 brings the back-to-back diode of the switching element Q2 into conduction through the smoothing capacitor C1. The switching element Q2 is then turned on. The current flows into the smoothing capacitor C1 through the back-to-back diode of the switching element Q2, the resonant inductor Lr, the winding N1, and the back-to-back diode of the switching element Q3. The voltage of the DC power supply V is applied to the resonant inductor Lr, and the current ILr decreases.

Since the switching elements Q2 and Q3 are turned on, after the current ILr reaches 0, the current ILr increases in the reverse direction. Then, the current ID1 passing through the winding N21 and diode D1 decreases and the current ID2 passing through the winding N22 and diode D2 increases.

(Mode d)

After the current ID1 reaches 0, mode c switches to mode d. Operation in mode d is symmetry to the operation in mode a. The power supply unit then enters modes e and f, and returns to mode a (=mode g). Operations in modes d to f can be easily understood because they are symmetry to the operations in modes a to c, so their detailed explanation will be omitted.

As described above, the power supply unit in the fifth embodiment uses the complex inductor in the first embodiment to reduce the circulating current so as to reduce the conduction loss and switching loss, improving its efficiency. The reduced loses enables the power supply unit to have a simplified heat dissipation structure, providing an effect of making the power supply unit compact and inexpensive.

Although the power supply unit in the fifth embodiment uses the inductors 11 and 21 of the complex inductor in the first embodiment of the present invention as the resonant inductor Lr and smoothing inductor L, respectively the power supply unit may use the inductor 21 and inductor 11 of the complex inductor as the resonant inductor Lr and smoothing inductor L, respectively. In addition, the power supply unit may use the complex inductor in the second or third embodiment. Of course, the power supply unit may use another complex inductor in which, its two inductors are magnetically coupled in a direction in which, when one of the two inductors releases energy, the current flowing in the other inductor reduces, regardless of the directions of the currents flowing in the two inductors.

In the circuit diagram, shown in FIG. 5, of the power supply unit in the fifth embodiment, the rectifying circuit uses two diodes D1 and D2. However, it can be easily understood that even when four diodes are used to form a diode bridge rectifying circuit, the conduction loss and switching loss can be reduced by reducing the circulating circuit according to the same principle.

[Sixth Embodiment]

Figure 6:
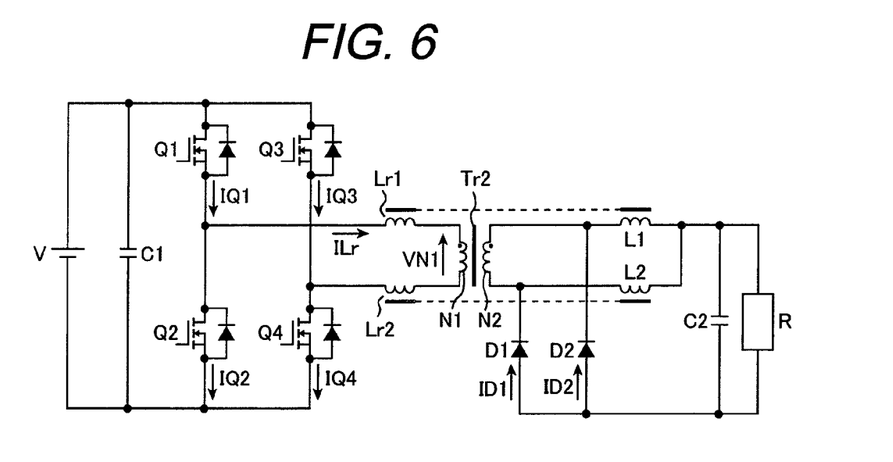
FIG. 6 is a circuit diagram of a power supply unit in a sixth embodiment of the present invention.

A power supply unit in a sixth embodiment according to the present invention will be described below with reference to FIG. 6, a complex inductor that embodies the present invention being applied to the power supply unit. FIG. 6 is a circuit diagram of the power supply unit in the sixth embodiment of the present invention. Only differences between the circuit structure shown in FIG. 6 and the circuit structure, shown in FIG. 5, of the power supply unit according to the fifth embodiment will be described. A first difference is that two resonant inductors Lr1 and Lr2 connected in series are used instead of the resonant inductor Lr in the fifth embodiment.

In the transformer Tr2, the windings N1 and N2 are magnetically coupled. One end of the diode D1 and one end of the smoothing inductor L2 are connected to one end of the winding N2. One end of the diode D2 and one end of the smoothing inductor L1 are connected to the other end of the winding N2. The other end of the smoothing inductor L1 is connected to the other end of the smoothing inductor L2. The other end of the diode D1 is connected to the other end of the diode D2. The smoothing capacitor C2 is connected between a connection point of the smoothing inductors L1 and L2 and a connection point of the diodes D1 and D2.

The power supply unit according to the sixth embodiment also supplies energy of the DC power supply V to the load R connected to the smoothing capacitor C2 in parallel by turning on and off the switching elements Q1 to Q4.

The complex inductor, shown in FIG. 1, according to the first embodiment of the present invention is used as the resonant inductor Lr1 and smoothing inductor L1, the complex inductor is also used as the resonant inductor Lr2 and smoothing inductor L2. That is, the power supply unit according to the sixth embodiment uses two complex inductors, which are defined as a first inductor and a second inductor. In the sixth embodiment, the inductors 11 and 21 of the first complex inductor are respectively used as the resonant inductor Lr1 and smoothing inductor L1, and the inductors 11 and 21 of the second complex inductor are respectively used as the resonant inductor Lr2 and smoothing inductor L2. The inductors in the first complex inductor may be exchanged and the inductors in the second complex inductor may be exchanged, as in the fifth embodiment.

The power supply unit according to the sixth embodiment is identical to the power supply unit according to the fifth embodiment except that an ordinary current doubler rectifying circuit is used. So, the operation of the power supply unit can be easily understood. While the circulating current is flowing, both the smoothing inductors L1 and L2 release energy and the resonant inductors Lr1 and Lr2 are magnetically coupled in a direction to reduce their currents. When this is noticed, it can be easily understood that the circulating current can be reduced as with the power supply unit according to the fifth embodiment.

The power supply unit according to the sixth embodiment uses a current doubler rectifying circuit, so it can offer high efficiency with ease even when the output current is relative high.

[Seventh Embodiment]

Figure 7:
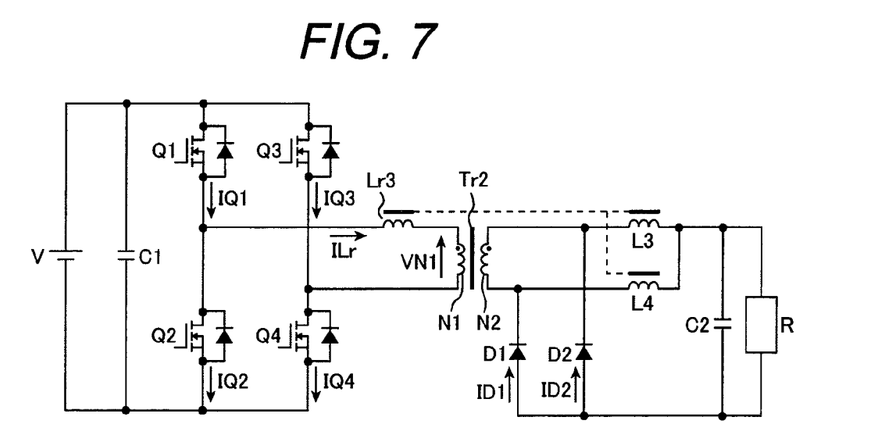
FIG. 7 is a circuit diagram of a power supply unit in a seventh embodiment of the present invention.

A power supply unit in a seventh embodiment according to the present invention will be described below with reference to FIG. 7, a complex inductor that embodies the present invention being applied to the power supply unit. FIG. 7 is a circuit diagram of the power supply unit in the seventh embodiment of the present invention. Only differences between the circuit structure shown in FIG. 7 and the circuit structure, shown in FIG. 6, of the power supply unit according to the sixth embodiment will be described. A first difference is that a single resonant inductor Lr3 is used instead of the resonant inductors Lr1 and Lr2 connected in series in the sixth embodiment.

The power supply unit according to the seventh embodiment also supplies energy of the DC power supply V to the load R connected to the smoothing capacitor C2 in parallel by turning on and off the switching elements Q1 to Q4.

In the seventh embodiment, the inductor 14, inductor 44, and inductor 34 of the complex inductor, shown in FIG. 4, according to the fourth embodiment of the present invention are respectively used as the resonant inductor Lr3, smoothing inductor, L3, and smoothing inductor L4. The polarities of the inductors 34 and 44 are the same as when the terminal 424 is connected to the terminal 426 as shown in FIG. 7. The polarity of the inductor 14 is the same as when the terminal 421 is connected to the first switching leg. In these connections, while the current ILr is circulating in the positive direction, the current flowing in the smoothing inductor L3 is higher than the current flowing in the smoothing inductor L4 and thereby both the smoothing inductors L3 and L4 release energy. Accordingly, the circulating current can be reduced according to the principle described in the fourth embodiment.

Although the power supply unit according to the sixth embodiment uses two complex inductors to form a current doubler rectifying circuit, the power supply unit according to the seventh embodiment uses the complex inductor according to the fourth embodiment to form a current doubler rectifying circuit with a single complex inductor, making the power supply unit effective in reducing its size and cost.

[Eighth Embodiment]

Figure 8:
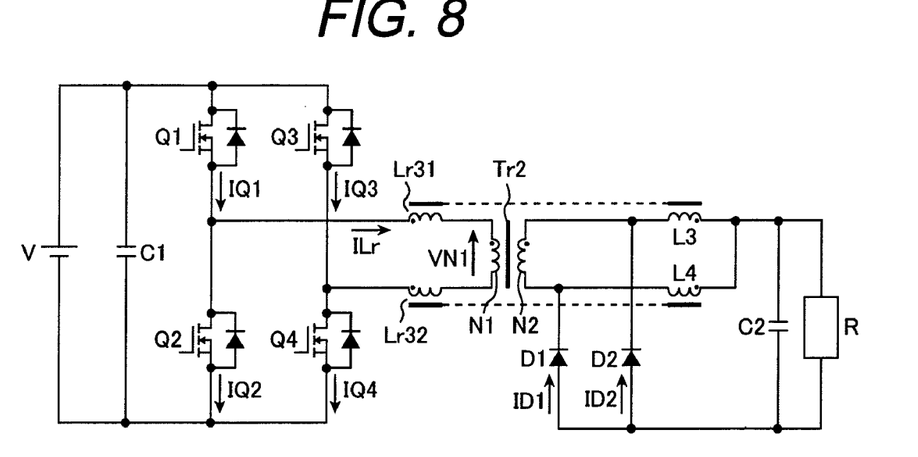
FIG. 8 is a circuit diagram of a power supply unit in an eighth embodiment of the present invention.

A power supply unit in an eighth embodiment according to the present invention will be described below with reference to FIG. 8, a complex inductor that embodies the present invention being applied to the power supply unit. FIG. 8 is a circuit diagram of the power supply unit in the eighth embodiment of the present invention. Only differences between the circuit structure shown in FIG. 8 and the circuit structure, shown in FIG. 7, of the power supply unit according to the seventh embodiment will be described. In the seventh embodiment, the inductor 14 of the complex inductor in the fourth embodiment shown in FIG. 4 is used as the resonant inductor Lr3. In the eighth embodiment, however, the windings 401 and 402 constituting the inductor 14 are separated; the winding 401 is used as the resonant inductor Lr31 and the winding 402 is used as the resonant inductor Lr32. The winding N1 of the transformer Tr2 is connected between the windings 401 and 402. That is, although, in the seventh embodiment, the windings 401, 402, and N1 are connected in series in that order from the first switching leg to the second switching leg, the order of the connection differs in the eighth embodiment; the windings 401, N1, and 402 are connected in series in that order.

Correspondence between the windings in the fourth embodiment in FIG. 4 and the circuit diagram in the eighth embodiment shown in FIG. 8 will be summarized. The connection between the windings 401 and 402 is discontinued and the winding N1 is connected. The winding 401 is used as the resonant inductor Lr31 and the terminal 421 is connected to the first switching leg. The winding 402 is used as the resonant inductor Lr32 and the terminal 422 is connected to the second switching leg. The winding 404 is used as the smoothing inductor L3 and the terminal 426 is connected to the smoothing capacitor C2. The winding 403 is used as the smoothing inductor L4 and the terminal 424 is connected to the smoothing capacitor C2.

It may be considered that the complex inductor in the fourth embodiment is formed by two complex inductors (windings 401 and 403 and windings 402 and 404) that have a fixed magnetic coupling polarity. FIG. 8 shows the magnetic coupling polarity.

Accordingly, it can be easily understood that the eighth embodiment differs from the seventh embodiment only in that the elements constituting the series-connected body between the first and second switching legs are connected in series in a different order, and the circuit operation is the same as that in the seventh embodiment.

Unlike the power supply unit according to the seventh embodiment, in the power supply unit according to the eighth embodiment, the elements constituting the series-connected body between the first and second switching legs can be connected in series in any order, so the displacement of parts can be optimized, making the power supply unit effective in reducing its size and cost.

[Ninth Embodiment]

Figure 9:
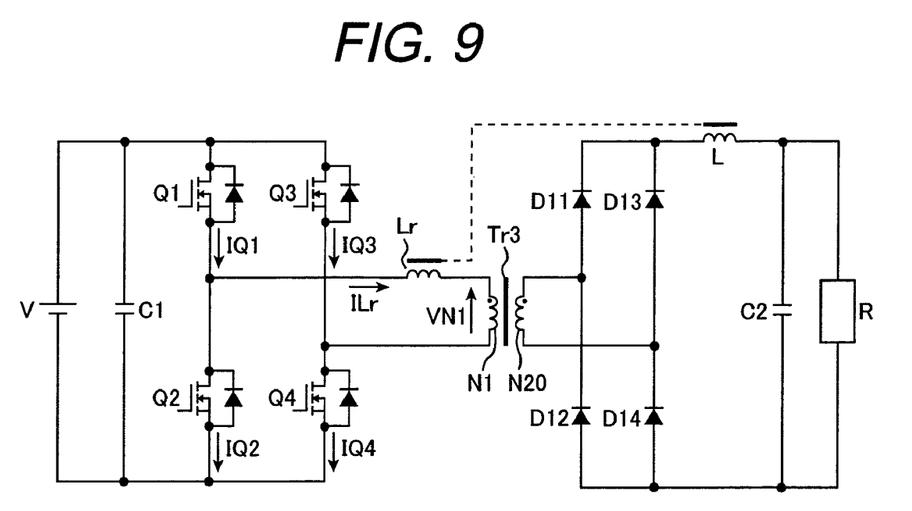
FIG. 9 is a circuit diagram of a power supply unit in a ninth embodiment of the present invention.

FIG. 9 is a circuit diagram of the power supply unit in a ninth embodiment of the present invention. Only differences between the circuit structure shown in FIG. 9 and the circuit structure, shown in FIG. 5, of the power supply unit according to the fifth embodiment will be described.

In the transformer Tr2, the windings N1 and N20 are magnetically coupled with each other. One ends of the diodes D11 and D12 are connected to one end of the winding N20. One ends of the diodes D13 and D14 are connected to the other end of the winding N20. One end of the smoothing inductor L is connected to the other ends of the diodes D11 and D13. One end of smoothing capacitor C2 is connected to the other ends of the diodes D12 and D14. The other end of the smoothing inductor L is connected to the other end of the smoothing capacitor C2.

The power supply unit according to the ninth embodiment also supplies energy of the DC power supply V to the load R connected to the smoothing capacitor C2 in parallel by turning on and off the switching elements Q1 to Q4.

In the ninth embodiment, the inductors 11 and 21 of the first complex inductor, shown in FIG. 1, according to the first embodiment of the present invention are respectively used as the resonant inductor Lr and smoothing inductor L. The inductors 11 and 21 may be used as other inductors, as in the fifth embodiment.

The power supply unit according to the ninth embodiment is identical to the power supply unit according to the fifth embodiment except that an ordinary bridge rectifying circuit is used. The operation of the power supply unit can be easily understood. While the circulating current is flowing, the smoothing inductor L releases energy and the resonant inductor Lr is magnetically coupled in a direction to reduce its current. When this is noticed, it can be easily understood that the circulating current can be reduced as with the power supply unit according to the fifth embodiment.

The withstand voltage of the rectifying element in the power supply unit according to the ninth embodiment can be reduced by using a bridge rectifying circuit, so the power supply unit can offer high efficiency with ease even when the output current is relative high.

What is claimed is:

1. A power supply unit that includes
a complex inductor;
a first switching leg in which a first switching element and a second switching element are connected in series;
a second switching leg in which a third switching element and a fourth switching element are connected in series;
a first smoothing capacitor connected in parallel to the first and second switching legs and a DC power supply;
a series-connection body including a resonant inductor and a primary transformer winding, the series-connection body being connected between a series-connection point of the first and second switching elements and another series-connection point of the third and fourth switching elements;
a transformer in which the primary transformer winding and a secondary transformer winding are magnetically coupled;
a rectifying circuit for rectifying a voltage generated in the secondary transformer winding;
a smoothing inductor; and
a second smoothing capacitor for smoothing, together with the smoothing inductor, the voltage rectified by the rectifying circuit; the power supply unit supplying power to a load connected in parallel to the second smoothing capacitor, wherein the complex inductor includes
a magnetic member having at least a first closed magnetic path and a second closed magnetic path, the magnetic member being structured so that a magnetic resistance of the magnetic member increases as a magnetic flux flowing in the closed magnetic paths increase;
a first inductor including one winding or a plurality of windings formed around at least part of the first and second closed magnetic paths, the windings being mutually connected; and
a second inductor including one winding or a plurality of windings formed around at least part of the first and second closed magnetic paths, the windings being mutually connected; and
wherein, when currents flow in both the first and second inductors, a magnetic flux generated by a current flowing in the first inductor and a magnetic flux generated by a current flowing in the second inductor strengthen each other in one of the first and second closed magnetic paths and weaken each other in the other of the first and second closed magnetic paths; and
wherein the first and second inductors are used as the smoothing inductor and the resonant inductor.

2. The power supply unit according to claim 1, wherein each of the first to fourth switching elements has a back-to-back diode.

3. The power supply unit according to claim 1 or 2, wherein:
the rectifying circuit includes a first diode leg in which first and second diodes are connected in series and a second diode leg in which third and fourth diodes are connected in series;
the secondary transformer winding is connected between a series-connection point of the first and second diodes and another series-connection point of the third and fourth diodes;
one ends of the first and second diode legs are connected to one end of the smoothing inductor;
one end of the second smoothing capacitor is connected to the other end of the smoothing inductor; and
the other ends of the first and second diode legs are connected to the other end of the second smoothing capacitor.

4. The power supply unit according to claim 1 or 2, wherein:
the rectifying circuit includes a first diode and a second diode;
the secondary transformer winding includes a connection body in which one end of a secondary winding of a first transformer is connected to one end of a secondary winding of a second transformer;
one end of the first diode is connected to the other end of the secondary winding of the first transformer;
one end of the second diode is connected to the other end of the secondary winding of the second transformer;
the other end of the first diode is connected to the other end of the second diode; and
a series-connection body including the smoothing inductor and the second smoothing capacitor is connected between a connection point of the first and second diodes and a connection point of the secondary windings of the first and second transformers.

5. The power supply unit according to claim 1 or 2, wherein:
the rectifying circuit includes a first diode and a second diode;
the smoothing inductor includes a connection body in which one end of a first smoothing inductor is connected to one end of a second smoothing inductor;
one end of the first diode and the other end of the first smoothing inductor are connected to one end of the secondary transformer winding;
one end of the second diode and the other end of the second smoothing inductor are connected to the other end of the secondary transformer winding;
the other end of the first diode is connected to the other end of the second diode; and
the second smoothing capacitor is connected between a connection point of the first and second diodes and a connection point of the first and second smoothing inductors.

6. The power supply unit according to claim 5, wherein:
the magnetic member includes a first magnetic member forming the first closed magnetic path and a second magnetic member forming the second closed magnetic path;
the first inductor is formed by connecting a first winding formed around the first closed magnetic path to a second winding formed around the second closed magnetic path;
the second inductor includes a third winding formed around the first closed magnetic path and a fourth winding formed around the second closed magnetic path; and
the first and second windings in the first inductor are interconnected in a direction in which an induced voltage in the first winding and an induced voltage in the second winding weaken each other, the two induced voltages being generated by a current flowing in the second inductor; and
the first inductor is used as the resonant inductor, and the third and fourth windings are respectively used as the first and second smoothing inductors.

* * * * *